Oct. 10, 1950  E. M. BROWN ET AL  2,525,338
HOUSEHOLD MIXER
Filed Sept. 6, 1949  2 Sheets-Sheet 1
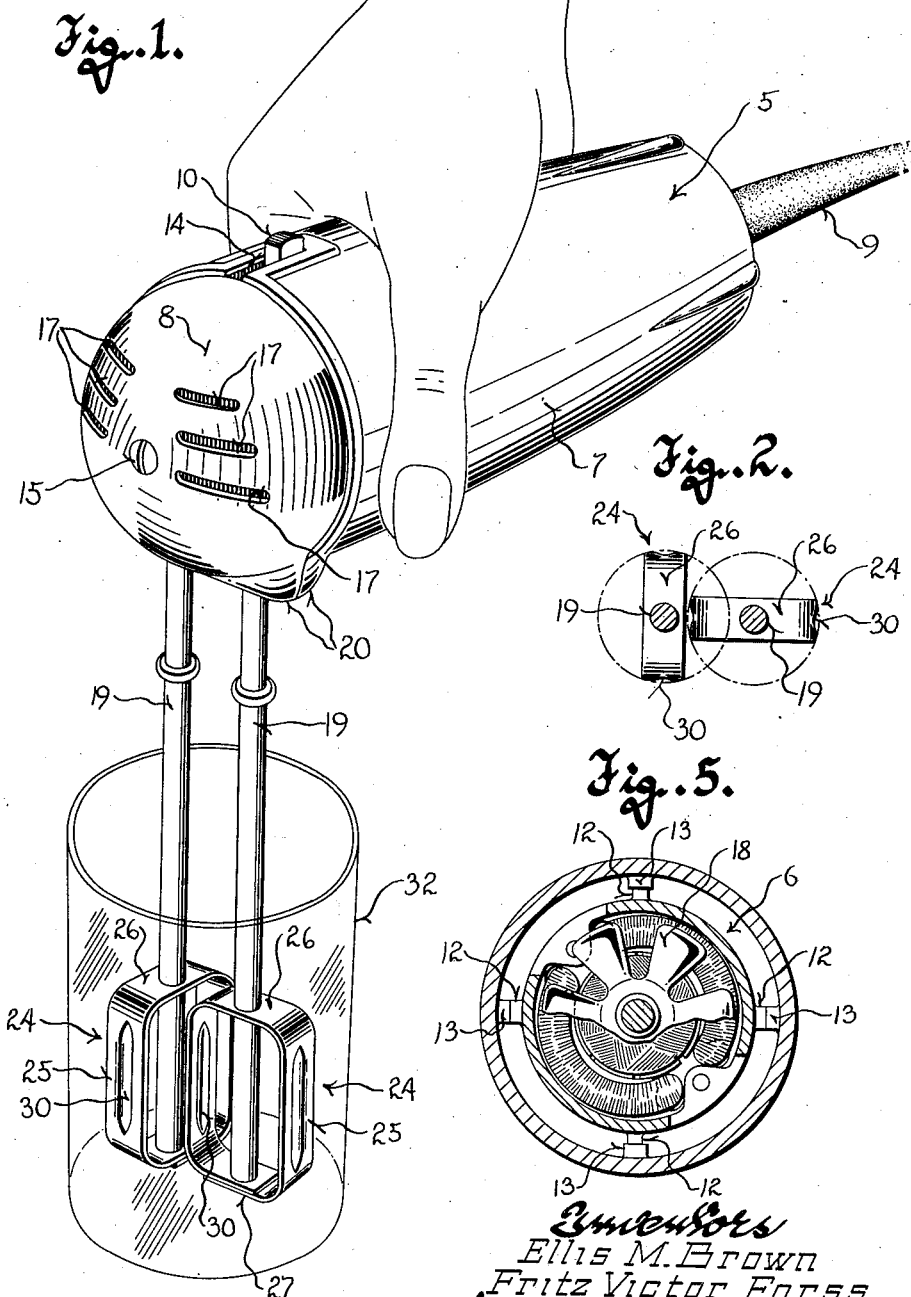

Oct. 10, 1950 E. M. BROWN ET AL 2,525,338
HOUSEHOLD MIXER
Filed Sept. 6, 1949 2 Sheets-Sheet 2
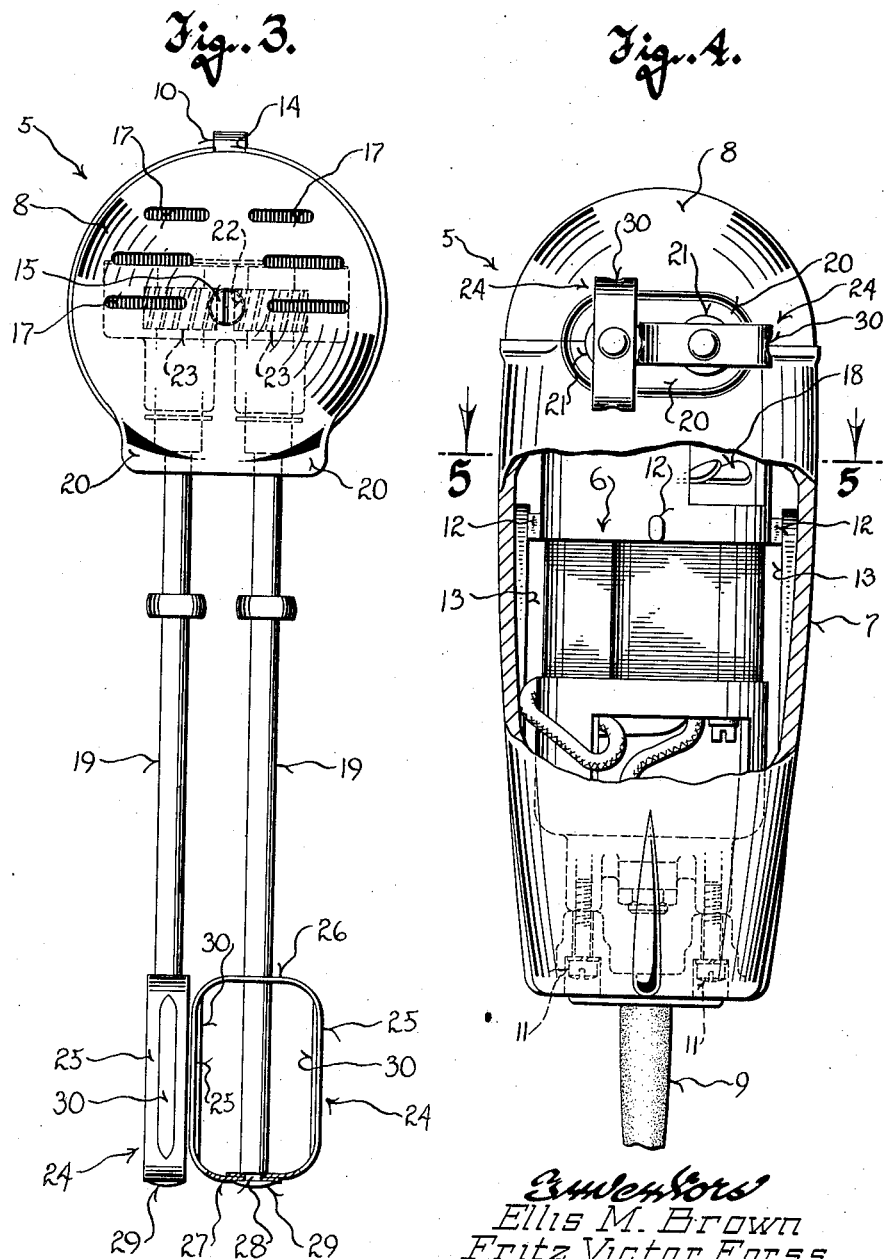
Inventors
Ellis M. Brown
Fritz Victor Forss Patented Oct. 10, 1950

2,525,338

UNITED STATES PATENT OFFICE 2,525,338

HOUSEHOLD MIXER

Ellis M. Brown and Fritz Victor Forss, Racine, Wis., assignors to John Oster Manufacturing Company, Racine, Wis., a corporation of Wisconsin Application September 6, 1949, Serial No. 114,126

1 Claim. (Cl. 259—131)

This invention relates to mixers of the electric motor driven type which are used in the home for the mixing of foods and liquids such as beverages and the like.

Heretofore mixers of this type were quite large and required a special stand to support the mixer per se in a position of use during the mixing operation. Almost always, mixing was performed in one of a number of special bowls supported on a revoluble table formed as part of the mixer stand. Such mixers were invariably provided with a relatively large and heavy electric motor, and the housing for this motor, though detachable from the stand to enable the mixer per se to be used remote from the mixer stand, had to be provided with a special handle by which the mixer was held when operated remote from its stand.

The relatively large and powerful electric motor for the mixer per se was necessitated by reason of the fact that it was required to drive beaters of large size and sweep through heavy foods and batters such as encountered in baking.

While the conventional type of mixers described operated satisfactorily for many uses, they were nevertheless clumsy and heavy to hold when used apart from their stands. Moreover there were many limitations upon the use of such mixers. The large size and sweep of their beaters made it impossible to use these conventional mixers in small receptacles, or for the mixing or whipping of small amounts of foods and beverages, and limited the mixers to use almost exclusively with the large special bowls provided with the mixer set.

With these objections in mind it is one of the primary objects of this invention to provide a portable electric food mixer of the character described having unusual versatility in that it may be used in any ordinary receptacle and in ordinary drinking glasses down to about two inches in diameter for the mixing of small amounts of liquid or other food materials.

More specifically it is an object of this invention to provide a portable electric mixer of the character described which may conveniently be held in one hand during all of the mixing operations to which it may be put to use, thereby eliminating the need for a special stand and handle for the mixer.

A further object of this invention resides in the provision of a relatively small electric food mixer of the character described which will readily perform any of the mixing and beating operations normally encountered in the home without danger of overloading the relatively small motor for the mixer.

Still another object of this invention resides in the provision of a relatively small electric food mixer of the character described which features light weight and versatility in use, and which will cost but a fraction of the cost of the larger types of food mixers hereinbefore described.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawings illustrate one complete example of the physical embodiment of the invention constructed in accordance with the best mode so far devised for the practical application of the principles thereof, and in which:

Figure 1 is a perspective view of the mixer of this invention showing how the same can be operated inside an ordinary drinking glass;

Figure 2 is a cross sectional view through the beater shafts looking down on the beaters;

Figure 3 is a front elevational view of the mixer shown in Figure 1;

Figure 4 is a plan view looking at the underside of the mixer shown in Figure 3 and having portions of the housing broken away and shown in section; and Figure 5 is a cross sectional view through the body of the mixer taken along the plane of the line 5—5, Figure 4.

Referring now more particularly to the accompanying drawings in which like numerals indicate like parts, the numeral 5 designates generally the housing which serves to enclose a relatively small elongated electric motor 6. As seen best in Figures 1 and 4 the housing is elongated and comprises a tubular body section 7 and a convex front end cap 8. While it is generally tubular it will be noted that the diameter of the housing decreases slightly toward its rear end.

The housing is slender enough to be conveniently grasped by and held in one hand, as will be apparent from Figure 1, so that the housing not only serves as an enclosure for the electric motor 6 but in itself provides a convenient handle for supporting and manipulating the mixer.

A single electrical cord 9 enters the center of the rear end of the housing and connects with the motor terminals inside the housing; and the motor circuit is conveniently controlled by a switch having its actuator 10 projecting through the top of the housing near the front thereof.

As seen best in Figures 4 and 5 the electric motor 6 is held spaced from the inner walls of the housing by four small equi-spaced boss-like lugs 12 projecting from the exterior of the motor and engaging four similarly spaced narrow longitudinal rails 13 on the inside of the body portion 7 of the housing. Inasmuch as the rails 13 extend for a considerable length along the medial portion of the body section 7, they not only act to hold the motor spaced from the housing walls but provide ribs to reinforce the housing. The lugs and rails, of course, cooperate to provide a space completely encircling all portions of the motor.

The motor is assembled by inserting it endwise into the open front of the body section of the housing, with the spacing lugs 12 thereon in register with the rails or ribs 13 on the inside of the housing and with the switch actuator 10 in line with a longitudinal slot 14 opening to the front of the body section of the housing. When the motor has been assembled in this fashion the switch actuator 10 is received in the bottom of the slot 14 and temporarily serves to hold the motor against rotation in a manner to carry its spacing lugs 12 off of the rails or ribs 13. The motor is secured in its proper position in the housing by a pair of screws 11 passing through the rear end of the housing and into suitable tapped bosses in the rear of the motor, and by attachment of the end cap 8 over the front of the motor by means of a single screw 15 passing through the cap and into a tapped boss on the front of the motor.

The front cap has a series of openings 17 therein, and the rear end of the motor likewise has openings, not shown, to provide for circulation of air through the interior of the housing. An impeller 18 on the motor shaft draws air into the housing for circulation therethrough, and as will be readily apparent such air sweeps over the entire exterior surfaces of the motor as well as the interior walls of the housing to cool the same during operation of the motor.

A pair of beater shafts 19 project from the side of the motor housing at the extreme front of its body section 7. In fact, the beater shafts enter the housing exactly on the line of parting between the body section 7 of the housing and the convex front end cap 8. At this portion of the housing it will be seen that both the end cap 8 and the body portion 7 have complementary boss sections 20 thereon which together form a single oval boss extending circumferentially of the housing.

The beater shafts project through holes 21 in this boss and their inner ends are coupled with the drive shaft of the electric motor through a transmission comprising a worm 22 on the motor shaft meshing with a pair of worm wheels 23 at opposite sides thereof. The worm wheels, of course, have detachable connections with the beater shafts and drive the same in opposite directions.

The beater shafts 19 have a length substantially equal to the length of the housing 5 and project from its underside substantially at right angles to the housing axis and in parallel spaced relationship to one another with their axes lying in a plane transverse to the axis of the housing. For the purposes of this invention the shafts are relatively close together, the spacing between their axes being only about three-quarters of an inch, or approximately one-quarter the diameter of the housing at its widest part. Stated in another way, the spacing between the axes of the beater shafts should be slightly less than one-half the diameter of the smallest glass in which mixing or whipping is to be accomplished, since it is one of the main objects of this invention to achieve mixing and whipping in ordinary drinking glasses down to about two inches in diameter. Mixing and/or whipping is accomplished by means of beaters 24, one fixed to the lower or outer end of each of the beater shafts 19. Each of the beaters comprises a length of relatively flat band stock bent flatwise to more or less rectangular shape to provide opposite parallel side blades 25 and upper and lower end blades 26 and 27, respectively, likewise parallel to one another.

The lower end blade 27 of each of the beaters is formed by the overlapping ends of the band from which the beater is formed, and these overlapping ends have aligning non-circular holes therein to receive a reduced non-circular neck 28 on the outer end of its shaft by which the beater is drivingly connected thereto. The outer ends of these necks are peened over as at 29 to secure the beaters against detachment from their shafts.

The upper end blade 26, of course, is provided with an aperture to more or less snugly receive the beater shaft and is not fixed thereto as is the lower end blade.

While the manner of forming and securing the beaters to their shafts is not of importance to this invention, it is highly essential that the opposite side blades 25 of the beaters be substantially parallel to one another and to the axis of their shaft, and that they be spaced a distance from the axis of their shaft substantially equal to the space between the shafts. In other words, if the space between the shafts is equal to approximately one-half inch, as is the case, the side blades 25 of the beaters should be spaced approximately one-half inch from the axes of their respective shafts.

With these proportions it will be noted that the total sweep of the beaters will be equal to the spacing between the shaft axes plus twice the distance between the axis of one of the shafts and one of the side blades thereon, making a total sweep of approximately one and three-quarters inches. This sweep is such as to permit operation of the beaters in small mixing receptacles and in ordinary drinking glasses down to about two inches in diameter at their bottoms.

Hence, the mixer of this invention can successfully mix or whip smaller amounts of material than can be handled with the larger conventional types of mixers.

The side blades 25 have a length about one and one-half times as great as the end blades 26 and 27, and are also provided with inwardly depressed ribs 30 extending lengthwise thereof midway between the marginal side edges of the side blades. These ribs contribute toward better mixing and whipping action of the beaters without materially interfering with their passage through heavy bodied materials to be mixed.

Also by reason of the fact that the beater blades are all arranged to travel edgewise through the materials to be mixed or whipped during rotation of their shafts it will be apparent that they will easily cut through even the heaviest and most solid materials without overloading the small electric motor 6. However, overloading of the motor 6 is prevented not only by reason of the edgewise travel of the blades through the material to be mixed but by making the beaters quite small as described so as to minimize the leverage which their side arms exert upon the beater shafts in opposition to the driving torque of the motor. In this connection also the provision of a worm drive between the motor and the beater shafts assures that the maximum torque of the motor will be utilized to the best possible extent to rotate the beaters without the possibility of the load on the beaters slowing down the motor and causing overheating of the same.

In accordance with conventional practice, it will be noted that the beaters 24 are fixed on their respective beater shafts in positions displaced from one another at an angle of about 90 degrees, as seen best in Figure 2; the object being to provide for clearance of the mixer blades during rotation of the beaters in opposite directions.

It has been found in actual practice that the mixer of this invention may be conveniently held by one hand for all mixing. It is especially convenient for the whipping of extremely small amounts of cream, one or two tablespoonfuls in fact, in an ordinary drinking glass 32 such as indicated in Figure 1. Such small quantities of cream obviously cannot be whipped with the larger conventional types of electric mixers, and it is an extremely annoying fact that a person desiring an amount of whipped cream sufficient for only one person must either whip up many times the desired amount of cream or go without. It has also been found in actual practice that the mixer of this invention performs such tasks as mashing and whipping potatoes and mixing heavy cake and cooky batters with all of the ease of the larger, more powerful type of mixer hereinbefore described.

Hence it will be seen that the mixer of this invention has unusual versatility and that by reason of its small and convenient size its cost will be but a fraction of that of the larger conventional mixers. In this respect attention is directed to the fact that the mixer of this invention may be operated in almost any ordinary mixing bowl or cooking kettle with greater facility than heretofore, and that it thus obviates the need for special mixing bowls such as were provided with the larger conventional mixers.

From the foregoing description taken together with the accompanying drawings it will be readily apparent that this invention provides a portable electric mixer in which unusual versatility is achieved without sacrificing powerful and efficient mixing and whipping action of the mixer.

What we claim as our invention is:

A portable electric mixer for heavy duty mixing in bowls as well as for light whipping and mixing use in drinking glasses down to about two inches in diameter, comprising: an elongated hollow housing containing a small electric motor, said housing being slender enough to be comfortably grasped by and held in one hand so that the housing itself provides a handle for supporting and manipulating the mixer; a pair of beater shafts for the mixer drivingly connected at one end with the electric motor and projecting from the side of the housing near one end thereof with their axes substantially parallel and in a plane transverse to the axis of the motor housing and spaced apart on said plane slightly less than one-half the diameter of the smallest glass in which mixing or whipping is to be accomplished; and a beater fixed on the outer end portion of each shaft, each of said beaters comprising a band shaped to define substantially a rectangle having a pair of end blades connected with the shaft and extending crosswise thereof and spaced from one another lengthwise of the shaft, and a pair of side blades connecting the end blades and lying at opposite sides of said shaft and lengthwise thereof, all of said blades being arranged to travel edgewise during rotation of their shafts, the side blades being spaced from the shaft axis a distance approximately equal to the space between the shafts so that the total sweep of the side blades of the two beaters during operation of the mixer does not exceed the two-inch diameter of the smallest glass in which mixing or whipping is to be accomplished, and so that the mixer may be used for heavy duty mixing without overloading the motor, and the end blades on each shaft being spaced from one another a distance greater than that of the side blades but such that the area of the space defined by the shaft and the heater blades at one side of it is approximately .6 sq. in.

ELLIS M. BROWN.
FRITZ VICTOR FORSS.

REFERENCES CITED

The following references are of record in the file of this patent:

UNITED STATES PATENTS

| Number | Name | Date |
| --- | --- | --- |
| 1,738,112 | Myers | Dec. 3, 1929 |
| 1,862,826 | Mross | June 14, 1932 |
| 2,046,109 | Dunne et al. | June 30, 1939 |
| 2,247,707 | Jordan | July 1, 1941 |
| 2,348,341 | Gough | May 9, 1944 |
| 2,477,150 | Snyder et al. | July 26, 1949 |
| 2,483,727 | Frisbie | Oct. 4, 1949 |